US009817639B2

(12) United States Patent
Jezyk et al.

(10) Patent No.: US 9,817,639 B2
(45) Date of Patent: Nov. 14, 2017

(54) COMPUTATIONAL DESIGN METHOD AND INTERFACE (71) Applicant: Autodesk, Inc., San Rafael, CA (US)

(72) Inventors: Matthew David Jezyk, Yardley, PA (US); Lev Lipkin, Weston, MA (US); Stephen J. Elliott, Somerville, MA (US); Peter Benjamin Boyer, Somerville, MA (US)

(73) Assignee: Autodesk, Inc., San Rafael, CA (US)

( * ) Notice: Subject to any disclaimer, the term of this patent is extended or adjusted under 35 U.S.C. 154(b) by 29 days.

(21) Appl. No.: 14/500,664

(22) Filed: Sep. 29, 2014

(65) Prior Publication Data
US 2015/0095881 A1    Apr. 2, 2015

Related U.S. Application Data (60) Provisional application No. 61/883,766, filed on Sep. 27, 2013.

(51) Int. Cl.
*G06F 9/44* (2006.01)
(52) U.S. Cl.
CPC .................... *G06F 8/34* (2013.01)
(58) Field of Classification Search
CPC .......................................... G06F 8/34
USPC ........................................ 717/108
See application file for complete search history.

(56) References Cited

U.S. PATENT DOCUMENTS

| | | | | |
|---|---|---|---|---|
| 2005/0038636 A1* | 2/2005 | Wakelam | ............ | G06F 17/5004 703/1 |
| 2005/0131657 A1* | 6/2005 | Sean Mei | ............... | G06T 17/00 703/1 |
| 2008/0015823 A1* | 1/2008 | Arnold | ...................... | G06F 8/20 703/1 |
| 2008/0027684 A1* | 1/2008 | Inzinga | ............... | G06F 17/5004 703/1 |
| 2008/0294389 A1* | 11/2008 | Ravnikar | ................ | G06F 17/50 703/1 |
| 2010/0268513 A1* | 10/2010 | Loberg | ................ | G06F 17/5004 703/1 |
| 2014/0184592 A1* | 7/2014 | Belcher | ................... | G06T 19/00 345/420 |

OTHER PUBLICATIONS

Liu et al, Development for Parametric Design System of packaging Carton Based on Visual Basic and AutoCAD Platform, Advanced Materials Research, ISSN: 1662-8985, vol. 174, pp. 159-162, copyright 2001.*

* cited by examiner

*Primary Examiner* — Li B Zhen
*Assistant Examiner* — Daniel Wei
(74) *Attorney, Agent, or Firm* — Gates & Cooper LLP (57) ABSTRACT

A method, system, apparatus, computer program product, and computer readable storage medium provide the ability to define an object in a parametric modeling application. Geometric parametric objects are authored and organized into a family definition. Via a user interface, enhanced computational logic is defined. The logic is compiled into the family definition such that the enhanced computational logic is embedded at an object level of the one or more geometric parametric objects. Upon a building information model requiring a regeneration operation, the compiled enhanced computational logic is automatically executed.

18 Claims, 7 Drawing Sheets

COMPUTATIONAL DESIGN METHOD AND INTERFACE

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 61/883,766, filed on Sep. 27, 2013, by Matthew David Jezyk, Lev Lipkin, Stephen Elliott, and Peter Benjamin Boyer, entitled "COMPUTATIONAL DESIGN METHOD AND INTERFACE,".

BACKGROUND OF THE INVENTION

1. Field of the Invention

The present invention relates generally to drawing programs, and in particular, to a method, apparatus, and article of manufacture for attaching code directly to the geometry in a drawing.

2. Description of the Related Art

There exist methods for generating geometry with code or script, but there is currently not a way to attach code directly to geometry. Embodiments of the invention aim to solve that problem.

SUMMARY OF THE INVENTION

Embodiments of the invention (referred to as 'Project Honeycomb') allow users to supercharge aspects of parametric modeling applications (e.g., Autodesk™ Vasari™ or Revit™) by embedding code and logic into content called families (similar to blocks [e.g., in Autocad™] or parts [e.g., in Inventor™]). It allows end-users to write a small program (via a scripting language or a visual programming language) and have that program live on downstream and execute itself whenever the family (e.g., a window) needs to be regenerated inside a larger project (e.g., a building). This allows users to add their own object relationships and behaviors instead of relying solely on the relationship/behavior added as part of internal development efforts.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
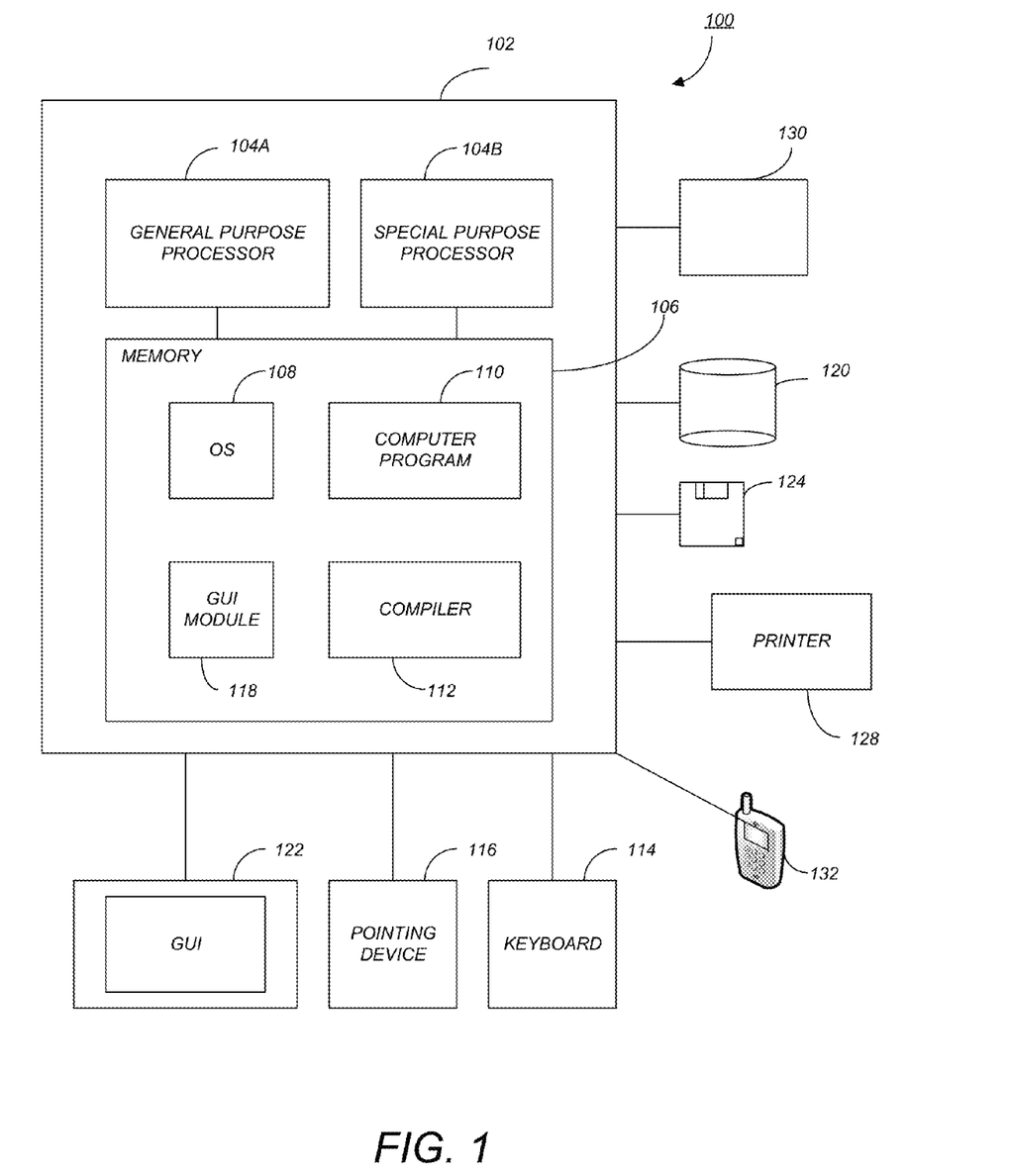
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
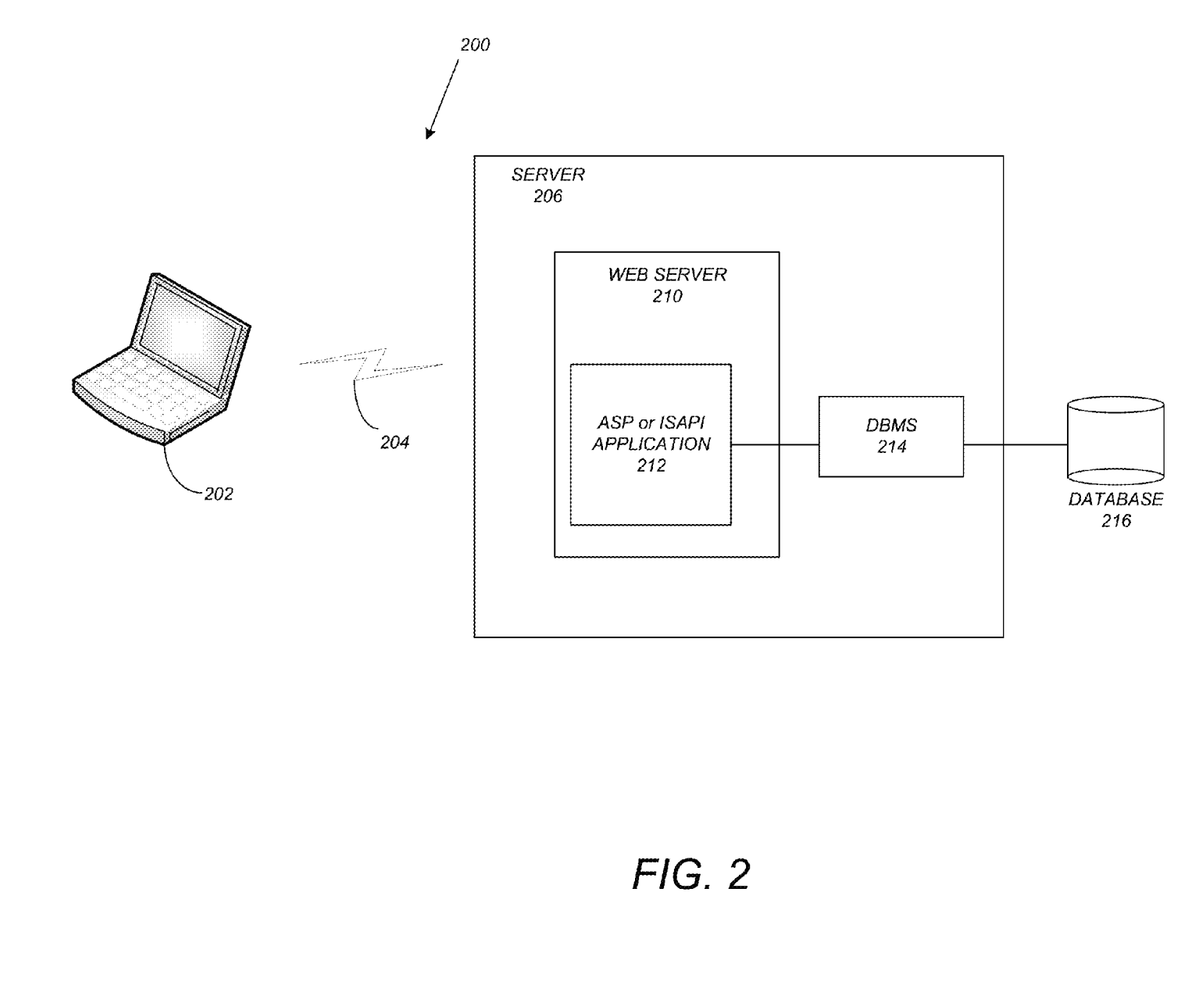
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Software Embodiment Overview

Embodiments of the invention are implemented as a software application on a client 202 or server computer 206. Further, as described above, the client 202 or server computer 206 may comprise a thin client device or a portable device that has a multi-touch-based display.

As described above, embodiments of the invention allow the user to supercharge aspects of parametric modeling applications (e.g., Autodesk™ Vasari™ or Revit™) by embedding code and logic into content called families (similar to blocks [e.g., Autocad™] or parts [e.g., in Inventor™]). It allows end-users to write a small program (via a scripting language or a visual programming language) and have that program live on downstream and execute itself whenever the family (e.g., a window) needs to be regenerated inside the larger project (e.g., a building). This allows users to add their own object relationships and behaviors instead of relying solely on the ones that are added/created as part of an application's internal development (e.g., by internal Autodesk™ developers/programmers).

Prior art systems may provide macro/scripting interfaces (e.g., Revit™/Autocad™/Inventor™/Intent™ or Maya™/Max™). Additional prior art systems may provide application-level or document-level scripting. However, in embodiments of the invention, the code/script lives at the object-level, inside a model object the user has placed. In other words, user-creatable embedded intelligence lives at the object level. Further, such code is re-executed automatically to re-create that object whenever needed. Accordingly, embodiments of the invention provide a more "bottom-up" strategy rather than a top-down strategy where an application-level or document-level script is run and is allowed to update the document. Thus, prior art systems fail to enable the user with the ability to create code that can be embedded into objects. Instead, such capability was static and only available to internal software developers of a parametric modeling application (e.g., using a framework like ObjectARX or custom objects in Maya™/Max™).

Advantages of embodiments of the present invention may include:

Ease of creation via scripting language and/or visual programming;

Allows end-users to extend functionality and add new relationships; and

Allows that logic and behavior to "live on" and run whenever needed to keep in sync with rest of a building model.

In addition to the above, embodiments of the invention are unique as it attempts to solve the problem of a script being attached to geometry, which makes it portable and editable.

Software Embodiments Details

Parametric modeling applications such as business information models (BIM) exist in the prior art. As used herein, a parametric modeler refers to a finite-dimensional model that can be described using a finite number of parameters. Further, a parametric modeler is aware of the characteristics of components and the interactions between them. In other words, a parametric modeler maintains consistent relationships between elements as a model is manipulated. For example, in a parametric building modeler, if the pitch of the roof is changed, the walls automatically follow the revised roof line. In parametric modeling applications, a user may create a large project (e.g., a building) as well as smaller pieces of the building (e.g., windows, doors, chairs, roof, etc.). The smaller pieces referred to as sub-objects also have a parametric representation (i.e., can be presented using a parametric equation based on one or more parameters). In a parametric modeling application, a user typically draws an object graphically and parametrically defines the sub-objects such that changes to the model propagate through the object.

While prior art systems enable the use of parametric representations of a model/sub-objects, such systems often do not provide a higher level language or a mechanism for expressing complicated computations or computational conditional logic. Accordingly, hand-drawn parametric systems may break down and fail to function properly.

Alternatively, prior art systems may provide a visual programming environment for building information models (BIM). However, such a visual programming environment is not embed into an object and is not associative/self aware. For example, the Dynamo™ visual programming environment or DesignScript™ scripting environment may extend parametric capabilities of parametric modelers with the data and logic environment of a graphical algorithm editor. However, such programming/scripting environments merely enable the execution of code in a hosted application (e.g., a parametric modeling application). In this regard, the prior art programming/scripting environments are not persisted/integrated into objects/families but instead merely consists of code that is executed within an overall modeler.

To better understand these problems, a description of BIM families and problems relating thereto may be useful.

As used herein, in a BIM, a family comprises a template for the creation of objects (e.g., "class"), serves as a container of all user authored geometry, provides a reference for other families and standard ("system") components, and enables the sharing of similar designs across projects. Family content provides the principal manner in which BIM data is created (as opposed to "drawing"). The efficacy/efficiency of the BIM is driven by the system intelligence about what a family is (e.g., a "door" is understood to be a "door" and not a blob of stuff). In this regard, families are components used to build a model, such as walls, windows, stairs, doors, etc. Each family can have multiple types, such as different size, materials, parameter variables, etc. Any change to a type is updated in every instance throughout a project. For example, when a window height of one window type is changed, all of the windows with the same window type may be updated instantly.

With families, no scripting is needed, and parametric/associative modeling is available based on sketching. Further, families provide build-in intelligence, behaviors, and special powers by category. Families are parametric in their local definition and associate in some ways with a project (e.g., window updates with a wall modification). The concept of a family provides that if a project is to be assembled (e.g., a building that has many sub-objects such as windows, doors, sinks, etc.), all of the sub-objects are categorized, instantiated and maintain a knowledge base regarding how they are connected with each other. For example, a family of doors may exist with various types such as 72 inches by 78 inches, wood, etc. Each door in the family has a geometric representation and a parametric representation such that if the user changes a door from 6 feet to 7 feet, the change propagates throughout every object of that type in a project and drives some dimensional constraints to update a door's geometry accordingly.

However, outside of the established hard-coded areas (e.g., a window expanding to fit in a wall), it is difficult to provide a family (or sub-object in a family) with higher level conditional logic such as the ability to adapt (e.g., add/remove elements) and/or to respond to stimuli generically (e.g., what should happen if a sub-object is stretched, moved to a different level, or if other data about the sub-object changes). Further, it is difficult to have a family and/or sub-object of a family pick up information about its surrounding context. In this regard, prior art systems provide a fixed toolbox and users are unable to expand authoring options. Further, prior art systems are not scalable, and constraint logic is not always apparent (e.g., it is unpredictable [e.g., as a result of automatic constraints]).

To overcome some of the limitations, prior art systems may utilize an application programming interface (API) add-in. However, such a family based API requires learning an advanced programming language, a user must build his/her own plugins, and such an API may be difficult to use. Alternatively, computational engines may exist (e.g., a scripting language). However, similar to API add-ins, such engines are not integrated into the families/objects themselves.

Embodiments of the invention provide the ability for a visual programming/scripting interface to be used to add more logic/control to the end user so that more intelligence can be embedded into a family. In this regard, a user has the ability to create higher order logic and persist such logic with an object/family. Accordingly, the logic infuses intelligence into an object that says with the object throughout the object's lifetime.

Figure 3:
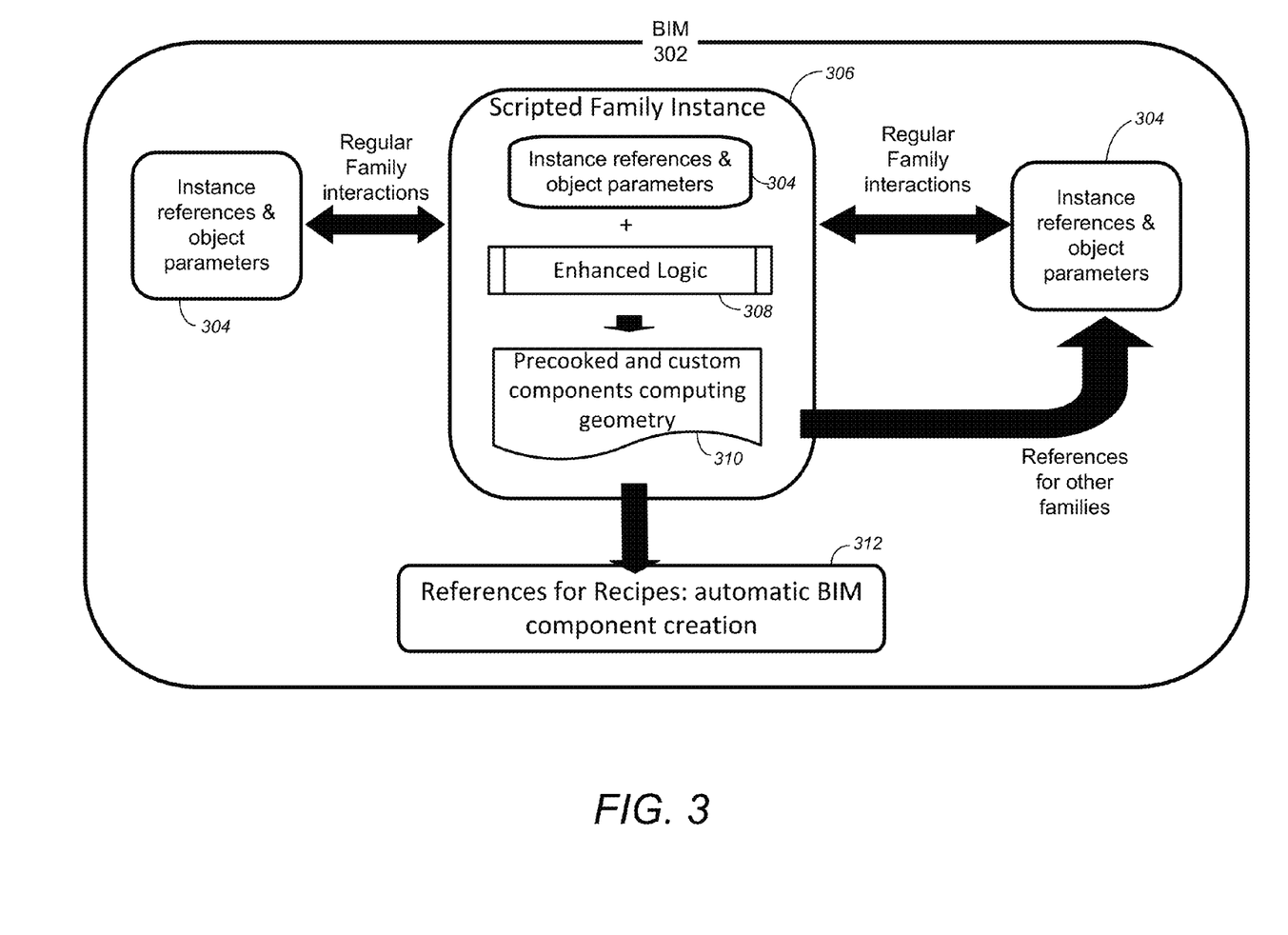
FIG. 3 illustrates the concept of the computational design provided in accordance with one or more embodiments of the invention.

FIG. 3 illustrates the concept of the computational design provided in accordance with one or more embodiments of the invention. BIM 300 has various sub-objects 304 that are instantiated (i.e., have instance references and object parameters). In addition to the standard objects 304, scripted family instance 306 is utilized in the BIM 302. Scripted family instance 306 represents objects 304 that are combined with enhanced logic 308 (e.g., created via visual programming or a script) to produce precooked and custom components computing geometry 310. The scripted family instances 306 conduct regular family interactions with remaining objects 304 within the BIM 302. Further, BIM 302 components may be automatically created based on the enhanced logic 308 (e.g., by placing/utilizing a reference 312 for such components).

The enhanced logic 308 lives at the object level, inside an instantiated model object 304. In other words, the enhanced logic 308 (created by a user using a visual programming interface, a scripting interface, and/or any type of program written in any language) is a compiled program that is embedded into the object 304. Whenever a regeneration operation is performed (e.g., that may occur whenever a parameter of the object/family is changed) (e.g., when an object is modified, placed, etc.), the embedded enhanced logic 308 is executed (e.g., by the regeneration engine). In this regard, the scripted family instance 306 is not merely geometry that is resolved but contains logic that can be defined by the user and executed. Further, by embedding the logic into a part, the part can be geometrically manipulated/moved directly (e.g., dragged around), thereby invoking a regen operation and the execution of the logic 308. As the part has logic 308 within it that is executed, the part may be considered self aware. Such logic 308 may enable the part to determine what is within the part's local context (e.g., within a certain number of pixels) and deploy itself in different ways based thereon. Additional exemplary enhanced logic 308 that may be executed includes read/write operations (e.g., to a file system), communicating with external servers, talking to other applications, etc.

As a specific example of the capabilities of a scripted family instance 306, in building design, a minimum fire rating may be required. Walls, doors, and other sub-objects may have a fire rating associated with them. When a door is placed in a wall having a particular fire rating, the enhanced logic 308 embedded in the wall object/door object may be self aware such that it determines whether the correctly fire rated wall/door object (consistent with surrounding objects) is being utilized. In this regard, if a door has a lower fire rating than a wall (that the door is being inserted into), the room will fail to comply with the desired fire rating.

Figure 4:
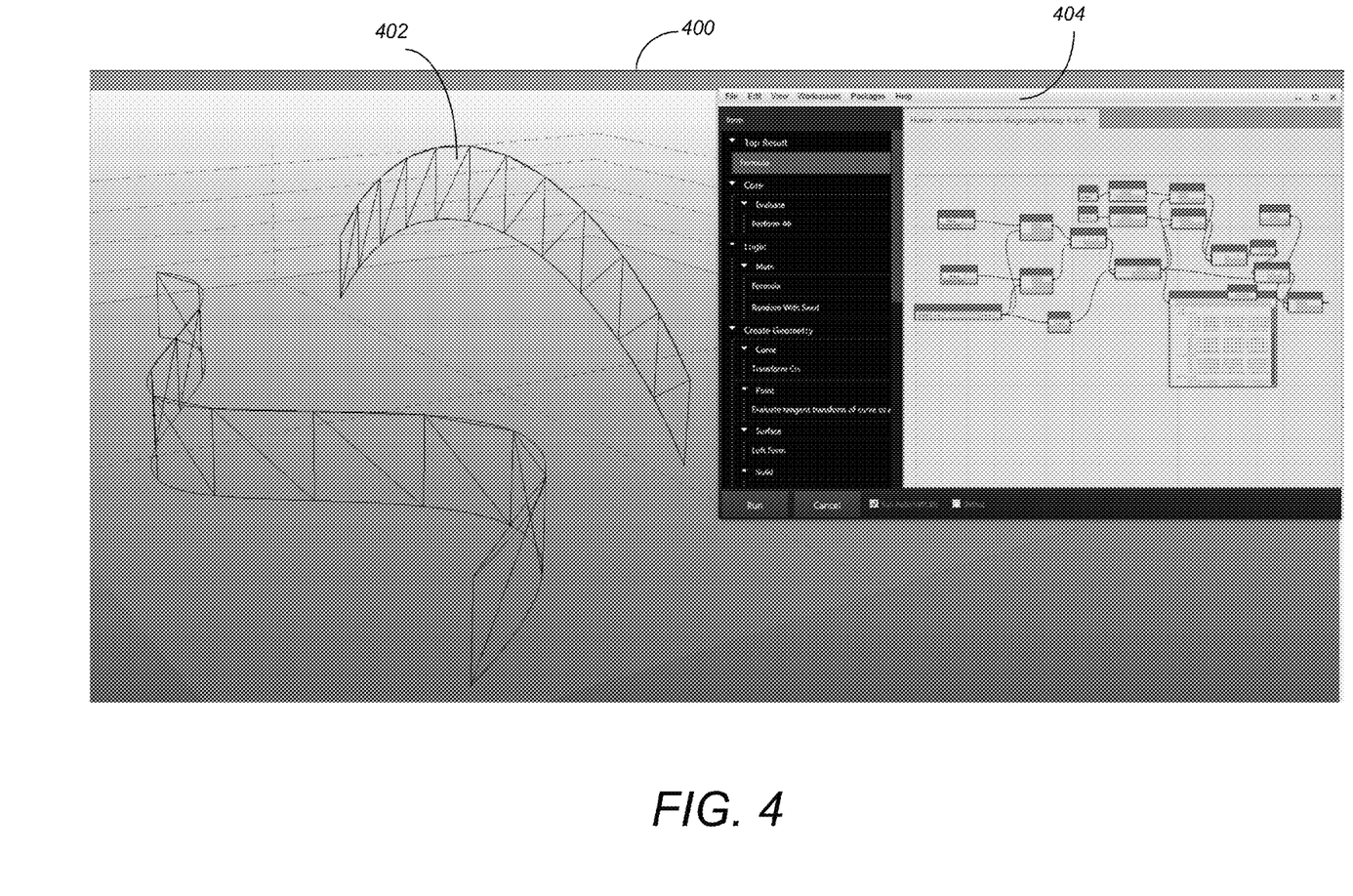
FIG. 4 illustrates an exemplary truss having embedded enhanced logic in accordance with one or more embodiments of the invention.

FIG. 4 illustrates an exemplary truss having embedded enhanced logic in accordance with one or more embodiments of the invention. The user interface 400 includes the geometric representation of the truss 400. The truss consists of a large steel/wood object made in a factory that is installed at a building location. Such a truss may be designed geometrically in a parametric modeling system. In this regard, a structural engineer/architect may define the geometry of the truss and how the truss should behave. To make the truss self-aware, a visual programming language is used to create enhanced logic. Window 404 illustrates the visual programming user interface used to create the enhanced logic (e.g., using nodes and wires/connectors/edges). Once the enhanced logic has been defined, it is compiled and embed into the truss such that the truss appears as any other object within a parametric modeling application.

The enhanced logic defined in window 404 may provide a specific pattern for the steel beams/components of the truss 402. When the truss 402 is inserted into a model, the enhanced logic embed in the truss 402 is executed. Accordingly, the truss object falls within the truss categorization of objects yet has enhanced logic (e.g., that may generate a pattern for the truss).

Figure 5:
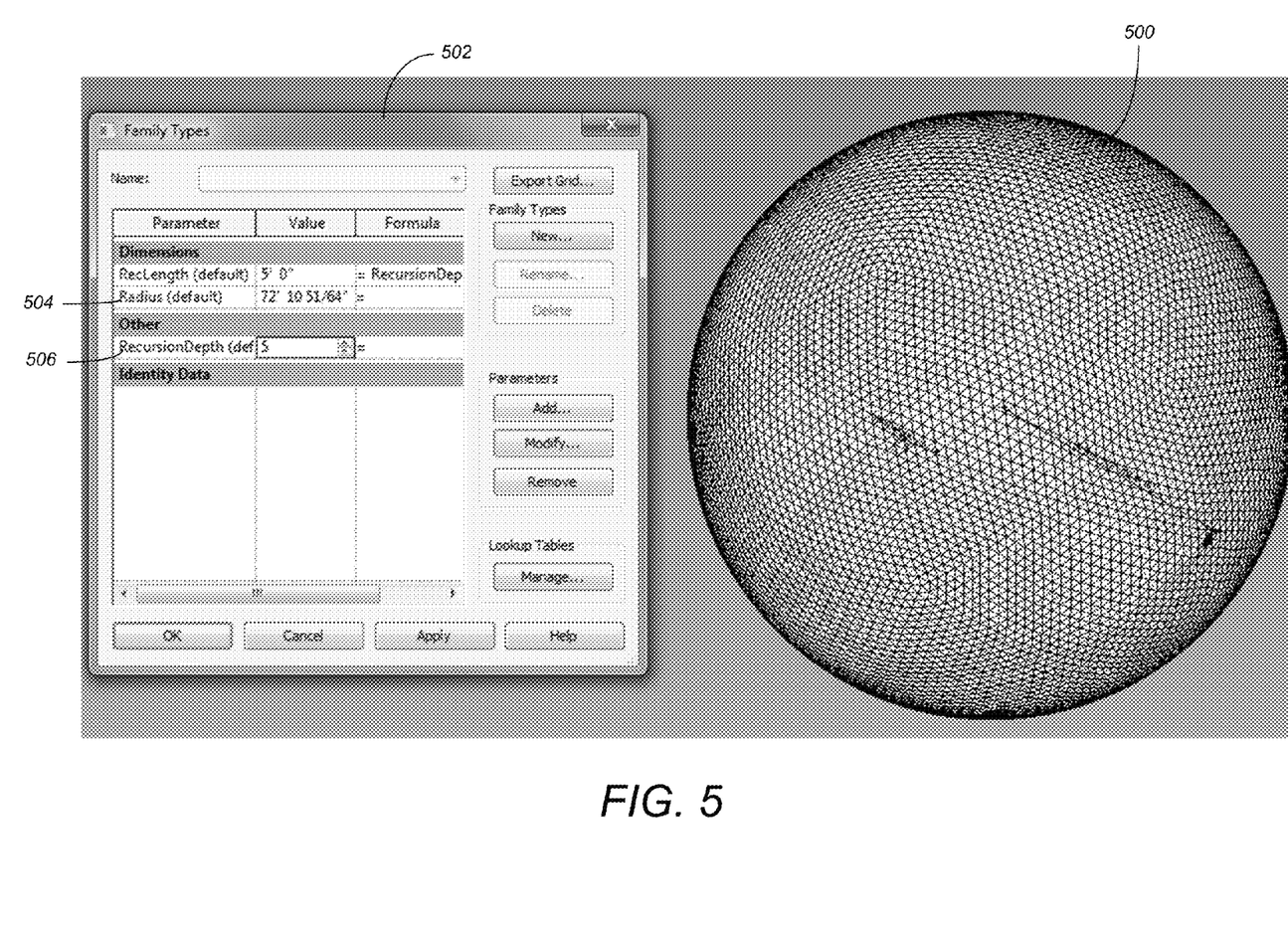
FIG. 5 illustrates an exemplary geodesic dome that has been embedded with enhanced logic 308 is tied to a family parameter in accordance with one or more embodiments of the invention.

FIG. 5 illustrates an exemplary geodesic dome that has been embedded with enhanced logic 308 that is tied to a family parameter. The enhanced logic 308 is compiled into the family definition of the dome 500. The user interface 502 is based off of and utilizes the enhanced logic 308 to create the dome 500. A geodesic dome is an efficient structure that is comprised of a series of triangles that can be repetitively subdivided to more accurately represent the dome/sphere 500. The user interface 502 allows the user to enter a radius 504 and the recursion depth 506 that specifies the depth for the recursive subdividing. The underlying enhanced logic 308 utilizes the user input to perform the recursive subdividing to create/modify the dome 500. Thus, from the user's perspective, the user interface 502 and dome 500 appear as any other object, yet the object has enhanced functionality.

Advantages

Based on the ability to create and embed enhanced logic 308 into objects 304 and/or families, many advantages are available. For example, users can update the object/family definition programmatically (e.g., adding/removing/changing elements in a family definition). Further, computational logic may be added to the family (providing advanced geometry and/or advanced layout logic). In addition, the enhanced logic 308 has the ability to persist when the family needs to regenerate (e.g., the script/enhanced logic 308 is contained in the family definition). Further, data may be driven from the project back into the family (e.g., via instance parameters and/or the location in the project). In contrast, prior art systems provide for scripts/add-ins that are only executed once and can therefore fall out of date. Further, prior art systems are not associative (cannot respond to change) and cannot be used to change an underlying family definition.

To embed the enhanced logic 308 into objects 304, the logic is compiled into the family definition of the object 304. Such embedding enables an object 304 that is always up-to-date, is associative with the model 302, and combines the best of native family regeneration with updating and visual programming/scripting.

Authors/Users

Many different types of users may utilize/interact with the enhanced logic/resulting object/family in accordance with one or more embodiments of the invention. To initially generate the enhanced logic 308, an "author" or "power user" may create the enhanced logic (e.g., via a visual programming and/or scripting environment). Such authors may include a designer, a toolmaker, an office standards bearer, a script/API developer, an experienced parametric modeling user, etc. The knowledge base of such an author may include the ability to place premade cells, supply references, simple and/or complex visual programming, script knowledge, etc.

Figure 6:
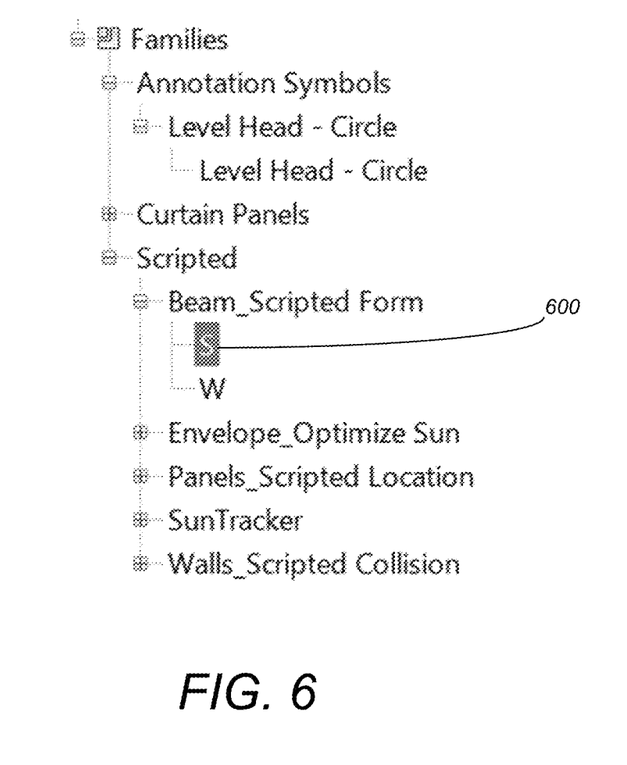
FIG. 6 illustrates a hierarchical tree structure containing an enhanced object that may be utilized by users within a parametric modeling application in accordance with one or more embodiments of the invention.

Once created and embed in an object, all other users may take advantage of and/or utilize the scripted family interface. The resulting scripted family interface/enhanced object appears as any other object within a family/family structure. For example, FIG. 6 illustrates a hierarchical tree structure containing an enhanced object 600 that may be utilized by users within a parametric modeling application.

Logical Flow

Figure 7:
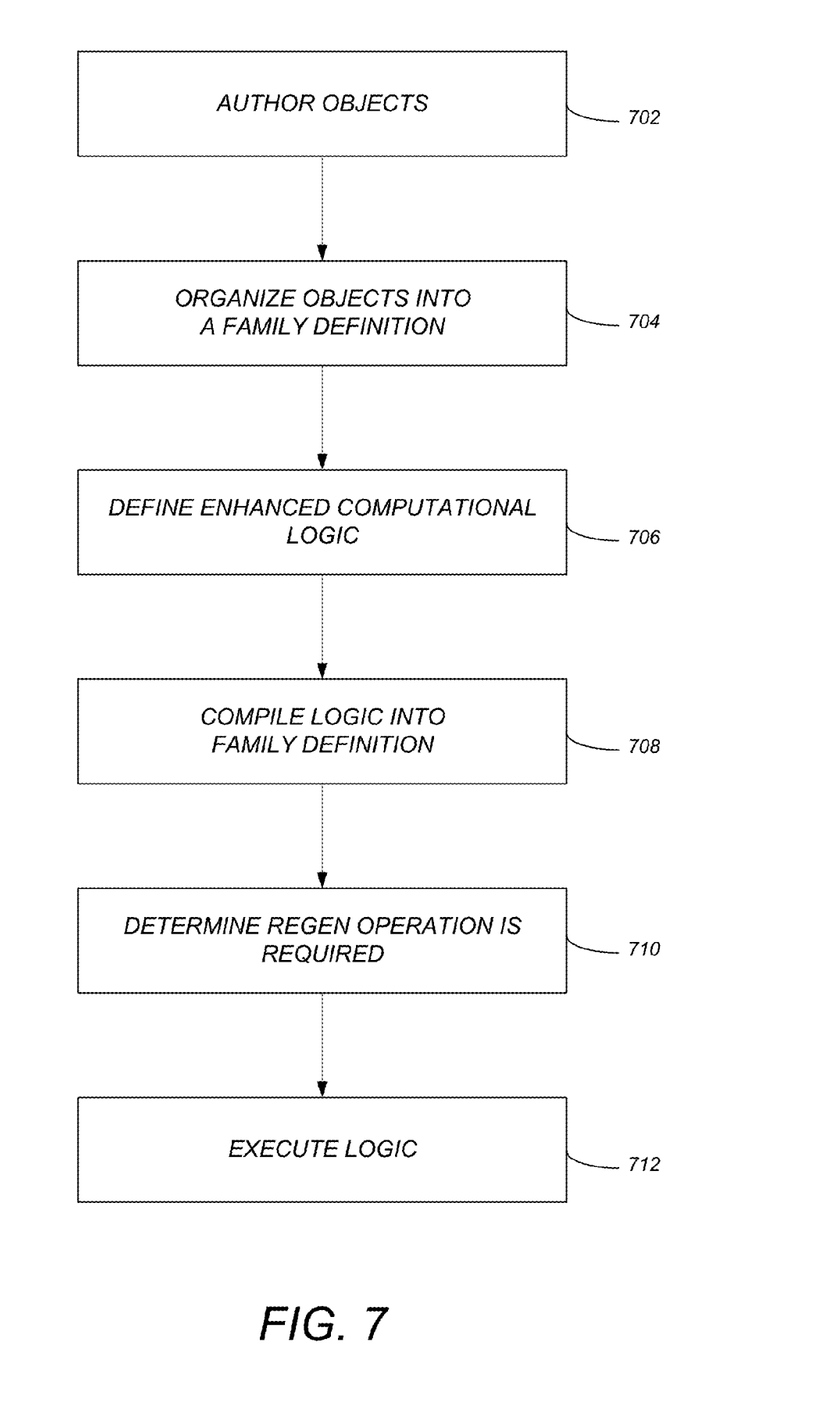
FIG. 7 is a flow chart illustrating the logical flow for defining an object in a parametric modeling application in accordance with one or more embodiments of the invention.

FIG. 7 is a flow chart illustrating the logical flow for defining an object in a parametric modeling application.

At step 702, one or more geometric parametric objects are authored in a parametric modeling application.

At step 704, the objects are organized into a family definition.

At step 706, via a user interface, enhanced computational logic is defined (e.g., using a visual programming language or a scripting language). The logic may be extended functionality and/or new relationships for the objects At step 708, the logic is compiled into the family definition.

At step 710, a determination is made that a regeneration operation of the family is required.

At step 712, as part of the regeneration operation, the compiled logic is automatically executed (i.e., without additional user input). Such an execution of the logic serves to synchronize the objects with a building information model (BIM) in which the objects are associated. Further, the execution may re-create the objects.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for defining an object in a parametric modeling application, comprising:
    authoring one or more geometric parametric objects in the parametric modeling application;
    organizing the one or more geometric parametric objects into a family definition within the parametric modeling application, wherein a family defined by the family definition:
        comprises a template for creation of the one or more geometric parametric objects;
        serves as a container of all user authored geometry; and
        enables a sharing of designs across projects;
    defining, via user input in a user interface of the parametric modeling application, computational logic for a first geometric parametric object of the one or more geometric parametric objects;
    compiling the computational logic into the family definition such that the computational logic is embedded at an object level of the one or more geometric parametric objects, wherein the computational logic resides in an instantiated version of the first geometric parametric object, and wherein the computational logic enables the first geometric parametric object to be self aware such that the first geometric parametric object determines what is within a local context of the first geometric parametric object, and deploys in a different way based thereon;
    determining that a regeneration operation of the family is required, wherein a regeneration operation is required any time a change occurs in a model, in the parametric modeling application, that affects the first geometric parametric object; and
    as part of the regeneration operation, automatically executing the compiled computational logic, wherein the executing of the compiled computational logic comprises re-creating the one or more geometric parametric objects.

2. The computer-implemented method of claim 1, wherein the computational logic is defined using a visual programming language.

3. The computer-implemented method of claim 1, wherein the computational logic is defined using a scripting language.

4. The computer-implemented method of claim 1, wherein the computational logic comprises extended functionality for the one or more geometric parametric objects.

5. The computer-implemented method of claim 1, wherein the computational logic comprises additional new relationships for the one or more geometric parametric objects.

6. The computer-implemented method of claim 1, wherein the executing of the compiled computational logic synchronizes the one or more geometric parametric objects with a building information model (BIM) in which the one or more geometric parametric objects is associated.

7. An apparatus for defining an object in a parametric modeling application in a computer system comprising:
(a) a computer having a memory;
(b) an application executing on the computer, wherein the application is configured to:
(1) author one or more geometric parametric objects in the parametric modeling application;
(2) organize the one or more geometric parametric objects into a family definition within the parametric modeling application, wherein a family defined by the family definition:
(i) comprises a template for creation of the one or more geometric parametric objects;
(ii) serves as a container of all user authored geometry; and
(iii) enables a sharing of designs across projects;
(3) define, via user input in a user interface of the parametric modeling application, computational logic for a first geometric parametric object of the one or more geometric parametric objects;
(4) compile the computational logic into the family definition such that the computational logic is embedded at an object level of the one or more geometric parametric objects, wherein the computational logic resides in an instantiated version of the first geometric parametric object, and wherein the computational logic enables the first geometric parametric object to be self aware such that the first geometric parametric object determines what is within a local context of the first geometric parametric object, and deploys in a different way based thereon;
(5) determine that a regeneration operation of the family is required, wherein a regeneration operation is required any time a change occurs in a model, in the parametric modeling application, that affects the first geometric parametric object; and
(6) as part of the regeneration operation, automatically execute the compiled computational logic, wherein the executing of the compiled computational logic comprises re-creating the one or more geometric parametric objects.

8. The apparatus of claim 7, wherein the computational logic is defined using a visual programming language.

9. The apparatus of claim 7, wherein the computational logic is defined using a scripting language.

10. The apparatus of claim 7, wherein the computational logic comprises extended functionality for the one or more geometric parametric objects.

11. The apparatus of claim 7, wherein the computational logic comprises additional new relationships for the one or more geometric parametric objects.

12. The apparatus of claim 7, wherein the application is configured to execute the compiled computational logic comprises by synchronizing the one or more geometric parametric objects with a building information model (BIM) in which the one or more geometric parametric objects is associated.

13. A non-transitory computer readable storage medium encoded with computer program instructions which when accessed by a computer cause the computer to load the program instructions to a memory therein creating a special purpose data structure causing the computer to operate as a specially programmed computer, executing a method of defining an object in a parametric modeling application, comprising:
authoring, in the specially programmed computer, one or more geometric parametric objects in the parametric modeling application;
organizing, in the specially programmed computer, the one or more geometric parametric objects into a family definition within the parametric modeling application, wherein a family defined by the family definition:
comprises a template for creation of the one or more geometric parametric objects;
serves as a container of all user authored geometry; and
enables a sharing of designs across projects;
defining, in the specially programmed computer, via user input in a user interface of the parametric modeling application, computational logic for a first geometric parametric object of the one or more geometric parametric objects;
compiling, in the specially programmed computer, the computational logic into the family definition such that the computational logic is embedded at an object level of the one or more geometric parametric objects, wherein the computational logic resides in an instantiated version of the first geometric parametric object, and wherein the computational logic enables the first geometric parametric object to be self aware such that the first geometric parametric object determines what is within a local context of the first geometric parametric object, and deploys in a different way based thereon;
determining, in the specially programmed computer, that a regeneration operation of the family is required, wherein a regeneration operation is required any time a change occurs in a model, in the parametric modeling application, that affects the first geometric parametric object; and
as part of the regeneration operation, automatically executing, in the specially programmed computer, the compiled computational logic, wherein the executing of the compiled computational logic comprises re-creating the one or more geometric parametric objects.

14. The non-transitory computer readable storage medium of claim 13, wherein the computational logic is defined using a visual programming language.

15. The non-transitory computer readable storage medium of claim 13, wherein the computational logic is defined using a scripting language.

16. The non-transitory computer readable storage medium of claim 13, wherein the computational logic comprises extended functionality for the one or more geometric parametric objects.

17. The non-transitory computer readable storage medium of claim 13, wherein the computational logic comprises additional new relationships for the one or more geometric parametric objects.

18. The non-transitory computer readable storage medium of claim 13, wherein the executing of the compiled computational logic synchronizes the one or more geometric parametric objects with a building information model (BIM) in which the one or more geometric parametric objects is associated.

* * * * *